United States Patent [19]

Berkheimer

[11] Patent Number: 5,249,087
[45] Date of Patent: Sep. 28, 1993

[54] ROTATING HEAD AMPLIFIER FOR VCR

[75] Inventor: John R. Berkheimer, Tempe, Ariz.

[73] Assignee: Go-Video, Inc., Scottsdale, Ariz.

[21] Appl. No.: 745,734

[22] Filed: Aug. 16, 1991

[51] Int. Cl.$^5$ .................... G11B 15/12; G11B 15/14
[52] U.S. Cl. ........................... 360/61; 360/62; 360/64; 360/108
[58] Field of Search .................. 360/46, 61, 62, 64, 360/66, 67, 68, 108

[56] References Cited

U.S. PATENT DOCUMENTS

| | | | |
|---|---|---|---|
| 4,197,565 | 4/1980 | Watanabe | 360/77.16 |
| 4,511,934 | 4/1985 | Ohira et al. | 360/55 |
| 4,926,273 | 5/1990 | Tabuchi et al. | 360/64 |

Primary Examiner—David Mis
Attorney, Agent, or Firm—Harvey Kaye; Jerry Cohen; Edwin H. Paul

[57] ABSTRACT

A rotating scan device for use with magnetic storage media, including a rotor, multiple magnetic transducers on the rotor with suitable gaps and orientations for writing or reading electronically modulated signals directly to or from magnetic storage media. The transducers scan in a helical fashion and include video and audio heads. There are means on the rotor for receiving and amplifying the signals read by the magnetic transducers. The rotor has means on it for transferring the amplified read signals from the rotating device. The rotor also has means for receiving write signals, as well as means for driving the magnetic transducers with the write signals. Means are provided for transferring power to the amplifying, transferring, receiving and driving means. Analog switch means are located on the rotor for connecting one of the multiple video head signals to the transferring means, and the analog switch means has a control input. Logic select means are also located on the rotor, connected to the control input, for selecting which of the multiple video head signals is connected to the transferring means; and there are means for transferring the logic select signal to the rotating device.

15 Claims, 6 Drawing Sheets

ROTATING HEAD AMPLIFIER FOR VCR

FIELD OF THE INVENTION

This invention relates generally to reading from and writing to (recording) magnetic storage media, and, more specifically, to magnetic video tape via a rotating magnetic head.

BACKGROUND OF THE INVENTION

The video signals present on a video magnetic tape are read by a magnetic transducer in close contact with the tape. The transducer has a gap and as the tape passes this gap a changing flux pattern is created in the magnetic transducer. This changing flux pattern causes a changing current in windings on the magnetic transducer. This current is the video signal and it can be transformed into a voltage, amplified and conditioned as desired. One limitation which delayed the use of magnetic tapes for video signals was the relatively poor frequency response of the magnetic tape and the corresponding transducer.

A major technical breakthrough occurred when the rotating transducer principle was successfully applied to reading and writing magnetic tape signals. When the transducer is rotated counter to the direction of the tape, the apparent tape speed is proportionally increased, and thus the frequency performance of the tape is enhanced to allow video signals to be recorded on magnetic tape. This, together with the discovery that a lower frequency signal can be successfully frequency modulated by a much higher frequency, improved quality of magnetic tapes, helical scanning, azimuth recording and other improvements have resulted in high quality consumer video tapes and cassette recorders.

Since the transducer is rotating, the signals picked up must be transferred to and from this rotating device. Usually slip rings or rotating magnetic transformers are used for this transfer, but these devices are a source of performance limitations. They have poor frequency and impulse response, linearity and fidelity. They attenuate the signal and increase the noise. These limitations affect the signals read from the tape and the signals written on the tape resulting in a double performance loss.

BRIEF SUMMARY OF THE INVENTION

It is an object of this invention to overcome the foregoing limitations by amplifying the transducer signals directly as the signals are read from or written on the magnetic media. The quality of the signal, especially the signal to noise ratio, is improved with this system since the signals are amplified before they are transferred to and from the rotating scan device. The noise component generated from the transferring from the rotating device is reduced compared to the amplified signal.

When playing a magnetic tape, the magnetic transducer, often called a head, in the rotating device, receives the signal directly from the tape. The signal is amplified and then transferred from the rotating device to standard video electronics. The transferring means may be rotating transformers, slip rings, photoelectric devices or other magnetic devices. The video signals are typically analog so analog amplifiers are required, but this invention is applicable also to video tape having digital signals. The digital amplification will be in the nature of establishing levels and increasing drive capability so that impedance anomalies from transferring the signals from the rotating devices will have less harmful effect. The foregoing is directly applicable to the audio signals and especially to video tapes having digitally recorded audio.

There may be amplifying and conditioning signals for all the signals resident on the video tape including separate synchronizing signals and the audio and erase signals.

This approach can be used with all magnetic transducers (heads) used with magnetic tapes. They include tapes recorded with separate and multiple synch tracks, multiple and audio video transducers and any other special tracks.

In typical video cassette and tape recorders the tape is wrapped around the rotating device by 180 and in some cases 360 degrees. One magnetic head contacts the tape and scans (either reading or writing) one frame of video information, but this head loses contact with the tape. A second magnetic head is arranged on the rotating device to be in contact with the tape as the first head is breaking contact. This second head scans the next frame with no loss of synchronism since these heads are positioned and selected at specific times ensuring proper operation. The heads are usually 180 degrees apart on the rotating device and the system logic alternately selects the head as that head is physically in position to start reading the next frame.

A rotating transformer winding is used to transfer AC power to the rotating device, where rectifying and filtering components convert the AC to the proper DC voltages for the rotating electronics.

In the preferred embodiment of the present invention the amplifying, switching and selection circuitry is on the rotating device. In this case there must be means to transfer the selection and the power to the rotating device.

It is an object of this invention to overcome the foregoing limitations by amplifying the head signals directly as the signals are picked up from the video tape. The quality of the signal, especially the signal to noise ratio, is improved with this system since the signals are amplified before they are transferred from the rotating head. The noise component generated from the transferring from the rotating head is reduced compared to the amplified signal.

Since rotating head video track pickups use multiple pickups, two or four being prevalent, there must be means to select which pickup signal is being used. The selection circuitry may be off the rotating head, but then all the pickups must be amplified and transferred from the rotating head. But the selection circuitry may also be on the rotating head. There is circuitry which receives the signals from the magnetic pickups, and a rotating analog switch selects which pickup is active and only that signal is transferred from the head. There must be means to transfer the selection signal to the rotating head.

The concept is to place the first stage amplifier (i.e., the electronics which read and write directly on the tape) on the rotating head. This allows a low noise, most efficient electronics operation. The difficulty is that there can be no direct connections since the head is rotating.

In order to do this, one must transfer power, audio, video and control signals which select which head is active and whether to read or write. Also, the amplifier must be designed to withstand the rigors of rotating. If the system has more video heads, many have four, and an erase head, there may be more amplifiers.

The typical way of transferring these signals to and from the rotating head is with a transformer. However, any logic signal may be transferred in many ways, for example, by a transformer, a magnetic switch, an optical switch, a Hall device, and similar devices.

Other objects, features and advantages will be apparent from the following detailed description of preferred embodiments taken in conjunction with the accompanying drawings in which:

DETAILED DESCRIPTION OF THE DRAWINGS

Figure 1:
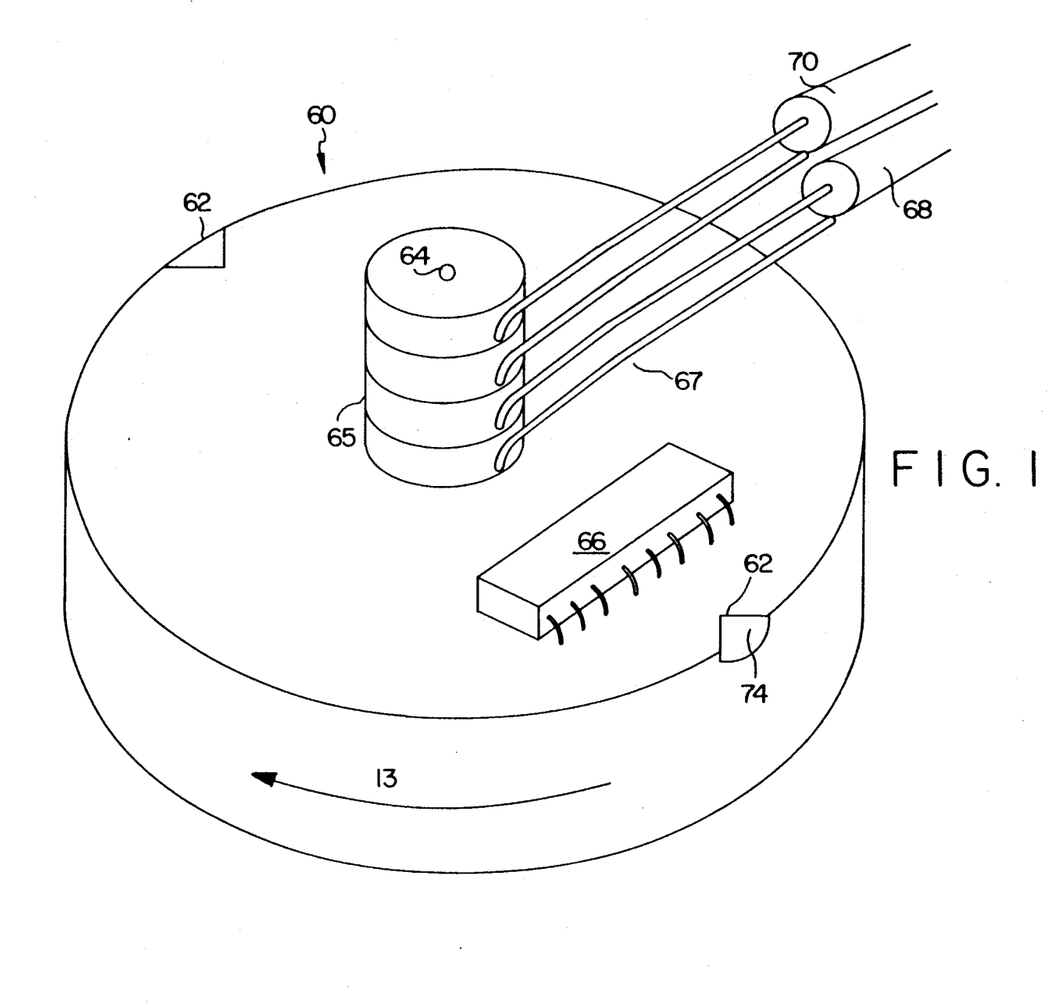
FIG. 1 is an arrangement where the rotating head signals are transferred from the rotating head to amplifying electronics by slip rings.

FIG. 1 is a rotating head embodiment of the type used in the present invention. Two rotating transducers, or heads, 62 are shown.

The tape travels as indicated by the arrow 13 and the device 60 rotates opposite to the tape direction. The heads 62 contact the tape and receive the magnetic information by the changing flux pattern as the head moves over the tape. The flux pattern is transformed into a current by windings around the magnetic pickups. These windings are arranged on the heads so that the changing magnetic flux passes through the windings thereby creating an electric current.

The electric current is received, amplified and conditioned, if needed, by electronics 66 mounted on the rotating device 60. In FIG. 1 the amplified signals are transferred from the rotating head by slip rings 65. The post 64, carrying the slip rings 65, rotates as the device 60 rotates. The slip rings have spring leaf electrical contacts 67 which slide on the surfaces of the rings 65. In this way the rotating signals are transferred from the rotating device to the coaxial cables 68 and 70. The selection of which signal is active occurs after the coaxial cables.

Figure 2:
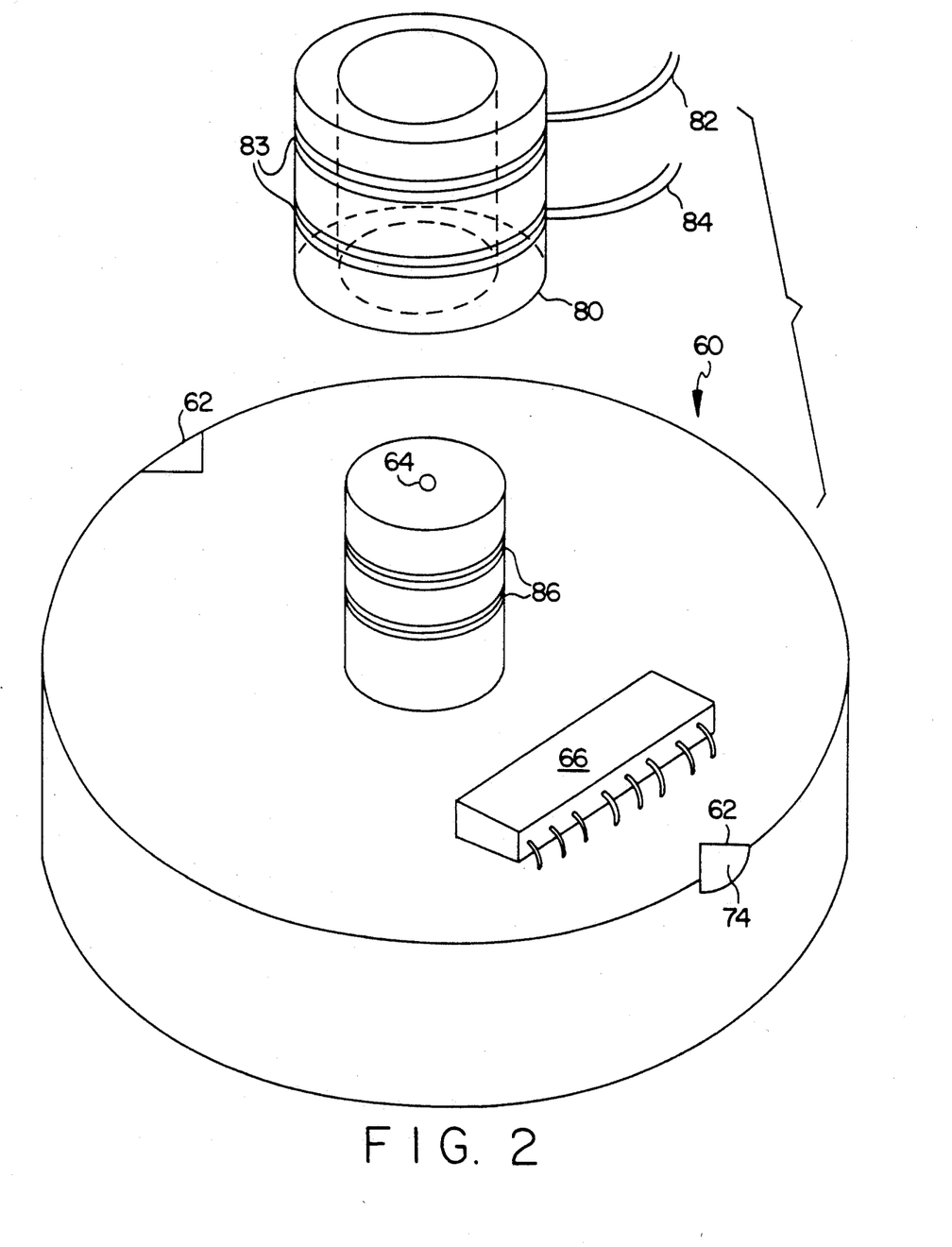
FIG. 2 is the same arrangement as in FIG. 1 except rotating transformers are used instead of slip rings.

FIG. 2 is an alternate and preferred embodiment wherein the amplified signals are transferred from the rotating head by rotating transformer windings 86 and corresponding stationary secondary windings 83. The windings 83 are mounted on a cylinder 80 which fits over the spool 64. The windings 86 correspond to the windings 83 and the signals are transported to standard stationary electronics by the signal wires 82 and 84.

Figure 3:
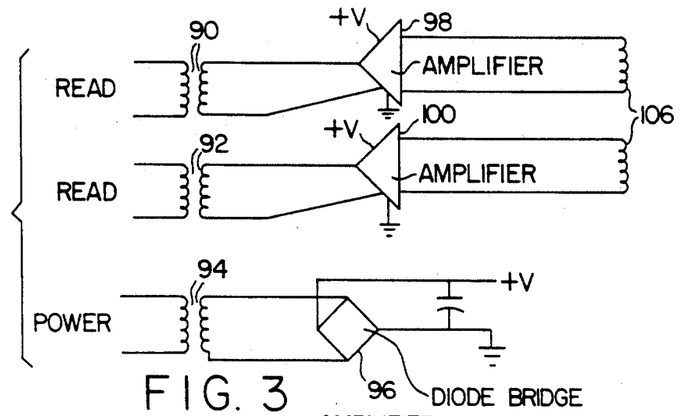
FIG. 3 is a schematic of the electronics mounted on a rotating video head for reading or playback from a tape.

Referring to FIG. 3, a playback only system is shown. The signals from the tape are picked up by the heads 106, and amplified by amplifiers 98 and 100. The amplified signals are transferred from the rotating device via rotating transformers 90 and 92. AC power is transferred to the rotating device by rotating transformer 94, rectified to DC by the diode bridge 96, filtered and used to power the amplifiers 98 and 100.

Figures 4, 4A:
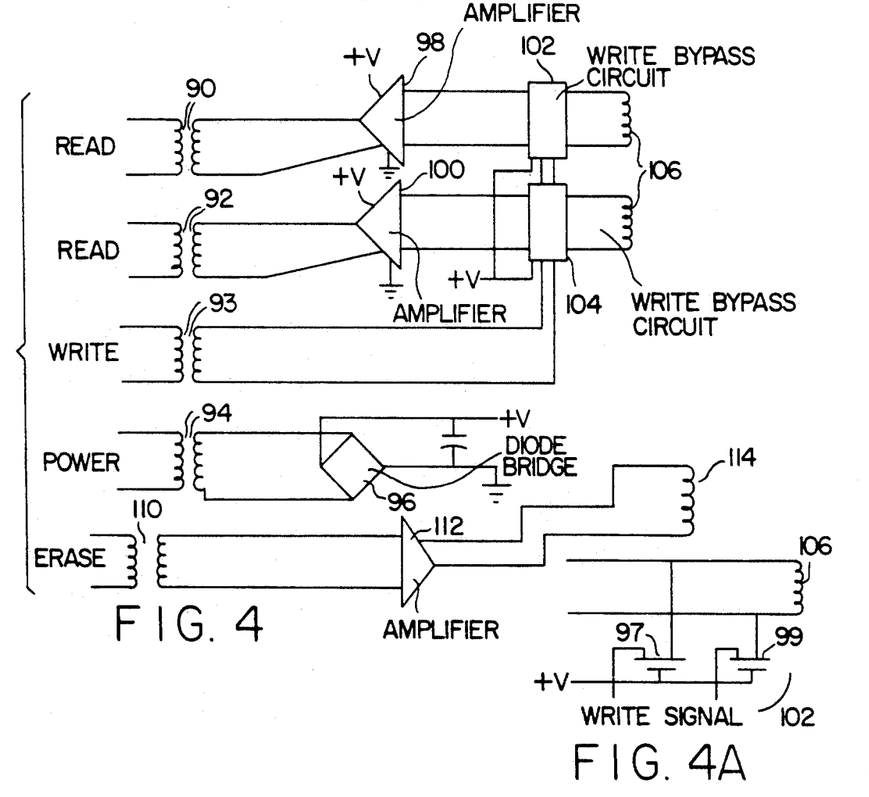
FIGS. 4 and 4a are schematic of the electronics for reading and writing to a magnetic tape where the power signal determines the control of writing or reading.

FIG. 4 is an extension of FIG. 3 showing the write signals. The write signals are those which are to be recorded onto the tape. The write signals are transferred to the rotating device by the transformer 93. The write bypass circuits 102 and 104 are where the write signals are indirectly connected to the connections from the heads 106. These circuits 102 and 104 are designed so that the write connections do not interfere with the read signals when playing the tape.

In FIG. 4 a simplified read/write control is formed using the power input 94. Power is supplied to the rotating devices through the rotating transformer 94 creating a +V voltage which powers the electronics 98 and 100. This voltage is supplied to the write bypass circuits 102 and 104. FIG. 4A is a detail of one implementation of the circuitry in 102. When +V is present the FETs 97 and 99 are biased off isolating the write transformer 93 from the heads 106. The read signals from the tape are fed to the read amplifiers 98 and 100 with no interference from the write transformer 93. When the power is removed +V becomes zero volts and the FETs are biased on providing a low impedance connection from the heads 106 to the write transformer 93. The amplifiers 98 and 100 are not powered and are so designed to present a high impedance to the heads 106 and do not interfere with the writing of signals on the tape.

The erase signal may be fed to the rotating device through a rotating transformer 110 and a write amplifier 112 to the head 114 to erase the tape.

Figure 5:
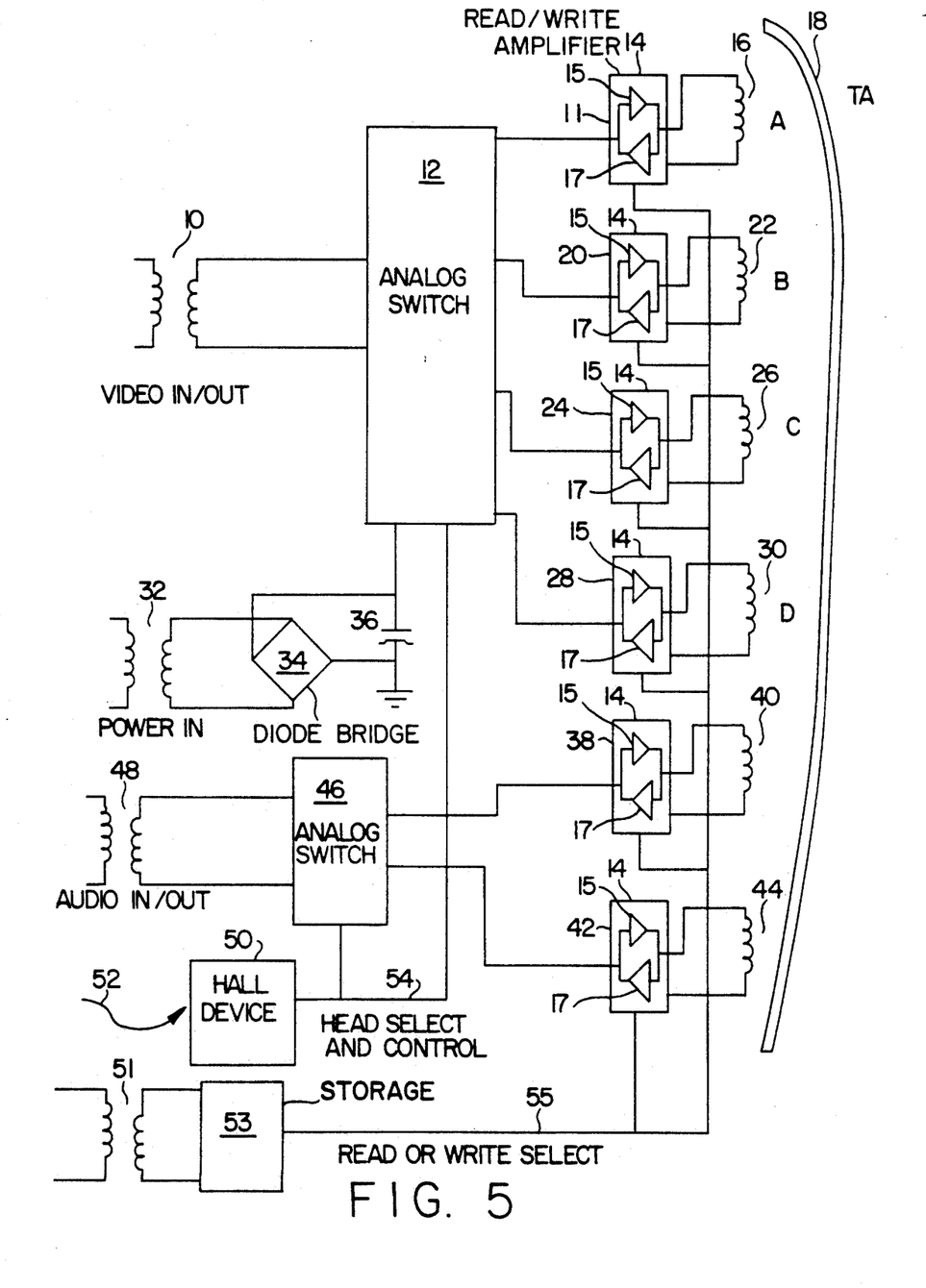
FIG. 5 is a schematic of a complete circuit for reading and writing a magnetic tape and the head selection needed.

A complete system is schematically shown in FIG. 5. The heads 16, 22, 26, 30, 40, and 44 are capable of reading and writing onto the tape 18. There are read and write circuits 11, 20, 24, and 28 which write on the tape and read from the tape. The analog switch 12 determines which head is connected, through the analog switch 12, to the video in/out rotating transformer 10. In FIG. 5 the two heads 16 and 22 are the pair used for standard play tapes and the two heads 26 and 30 are used for extended play tapes. The head select and control connection signal 54 is timed to select the video and audio heads which are physically in contact with the tape. The video head is connected through the analog switch 12 to the video in/out rotating transformer 10, and the audio head is connected through the analog switch 46 to the audio in/out rotating transformer 48.

A signal 52, generated off the rotating head, selects which heads are activated. This signal 52 is input to the Hall effect device 50, or its photoelectric, mechanical or magnetic equivalent. The output 54 from the Hall device 50 is fed to the switch 46 causing the switch 46 to connect one of the audio heads 40 or 44 to the audio in/out rotating transformer 48. The system is arranged so that the audio head in contact with the tape is selected (although there is usually some overlap). The output 54 also is input to the analog switch 12 causing the switch 12 to connect one of the video heads 16, 22, 26 or 30 to the video in/out rotating transformer 10. The control line 54 is constructed and arranged to select one of four choices for an extended four head playback system.

In this preferred embodiment another rotating transformer 51 is used to transfer the read-write control signal to the rotating head. As before there are several equivalents to the rotating transformer—photoelectric, mechanical and magnetic. The read/write control signal is stored 53 and a connection 55 is made to all the read/write amplifiers 14 (audio and video). The read/write amplifiers 14 are schematically shown as back to back amplifiers 15 and 17. The system is designed so that all the amplifiers 15 are activated and the amplifiers 17 are inactivated by the control signal 55 when the system is writing onto a tape 18. When the system is reading or playing a tape the control signal 55 changes state inactivating the amplifiers 15 and activating the amplifiers 17. In FIG. 5 the audio and the video read/write amplifiers are not differentiated; however, in actual implementation, the audio circuitry is different from the video circuitry—these difference are well known in the art.

Here the terms "play" and "play back" are used interchangeably with "read" and "reading from", and the terms "recording a" and "recording onto" are used interchangeably with "writing to".

When playing a tape the read amplifiers 17 receive the signals from the corresponding heads. The video signal is connected through the analog switch 12 to the rotating transformer 10 and so through to the video handling circuitry off the rotating head. The audio signal is directed through the analog switch 46 to the rotating transformer 48 and so through to the audio circuitry off the rotating head.

The analog switches 12 and 46 are bidirectional switches which allow selected signals to pass in either direction through the switches. The logic select signal 54 is synchronized with the angular position of the rotating device to always select the heads in proper contact with the tape. The select signal 54 is generated by a Hall effect device 50 which also stores the selection long enough for the scanning of the entire frame by the selected head.

Figure 6:
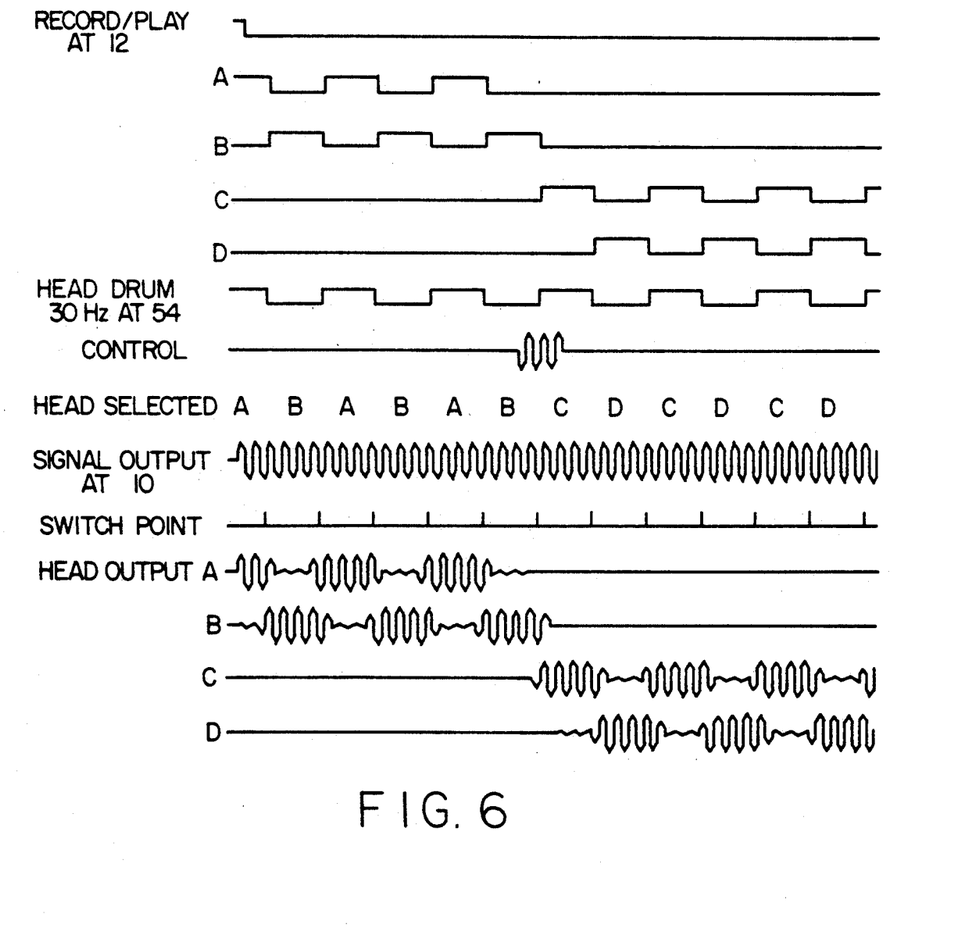
FIG. 6 is a timing chart of signals occurring during playback within the analog switch.

FIG. 6 is a timing chart showing the video signals when playing a tape. The record/play signal 55 in this preferred embodiment is low (an arbitrary selection) which activates the read heads 17 on the rotating transformer. The drum head 30 Hz signal is shown over several cycles where the A head 16 and the B head 22 are alternatively activated followed by alternately activating the C and D heads, as is a typical four head selection sequence. The analog switch 12 synchronously selects the proper head connecting that head to the output rotating transformer 10. The output from the analog switch 12 is the continuous concatenation of each head output into a single continuous signal. Each head signal lasts for one half of the head drum 30 Hz signal, or for about 16 milliseconds. During this time one video frame is played, then the next head selected plays the next video frame, etc.

Figure 7:
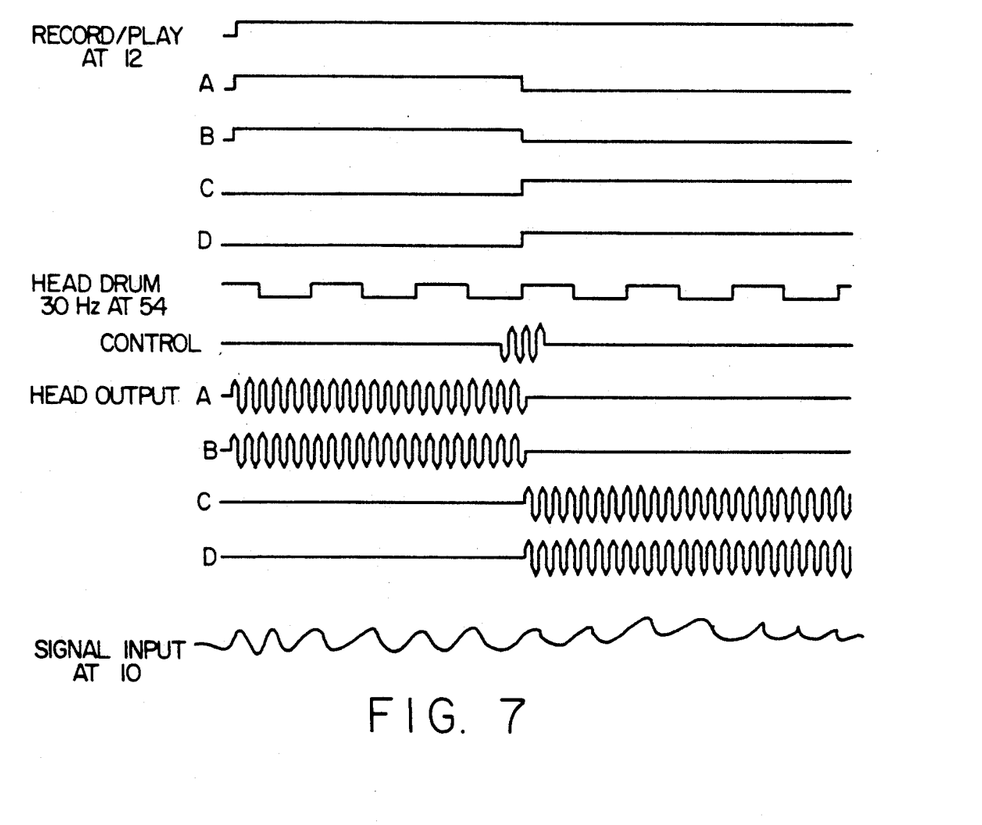
FIG. 7 is a timing chart of signals occurring during recording within the analog switch.

FIG. 7 is the corresponding timing chart for recording onto a tape. Here the record/play signal is high. This high signal activates the write amplifiers 15, and record signals are fed through the rotating transformer 10 to the analog switch 12 and then through the write amplifiers 17 and so onto the tape. The A and B heads are selected simultaneously and, as shown six video frames are recorded onto the tape and then the control signal 54 activates heads C and D for recording the subsequent frames.

Power is transferred to the rotating device as before through the rotary transformer 32, the diode bridge 34 and the filtering capacitor 36 to the analog switch and to all other electronics which require power (connections not shown).

If there are separate synchronizing tracks which must be written or read from the tape, the requisite electronics would be included in a similar fashion.

The audio signal may be handled in a similar fashion. Signals to be read from the tape 18 by head 40 pass through read amplifier 38, through the analog switch 46 to the transformer 48. When audio is to be written to the tape, the audio signal is sent through the transformer 48, through the bidirectional electronics switch 46 to the write amplifier 40 or 44, which records the audio signal on the tape 18.

Another preferred embodiment, not shown, would use the power as a switch control selecting either reading or writing as shown in FIG. 4, by using the bypass electronics 102 and 104, but in this embodiment write amplifiers are not used.

The erase signal may be fed to the rotating device through a rotating transformer, electronics and a write amplifier to erase the tape as shown in FIG. 4. In many cases the erase feature would not be on the rotating head but a separate head adjacent to the rotating head.

The electronics on the rotating head requires power. The power is supplied to the rotating head via transformer 32. An AC, or alternating signal, is rectified by the diode bridge 34 producing a DC, a non-alternating signal, which is filtered by the capacitor 36 which is then fed to power all the electronics.

In the preferred embodiment the electronics on the rotating head are large scale integration (LSI) components, but other preferred embodiments would include individual components.

FIG. 5 also represents a preferred embodiment which includes amplifying, selection and transferring means on a rotating head where all the signals are digital in nature. In this embodiment the signals are amplified so that the driving to and from the rotating head is done from a low impedance, where the impedance anomalies are reduced thereby improving the performance of digital video tapes. Here the rotating transformers 10, 32, 48 and 51 transfer digital signals, that is high or low where the sequences signifies the value. Also, the bidirectional analog switches 12 and 46 will transfer digital signals, and the red (playback) amplifiers 17 and the write (play) amplifiers 15 will handle digital signals. Optical devices may be substituted for the rotating transformers in FIG. 5 since the signals are digital, thus the light (in the optical device) is either on or off.

A variation of FIG. 5 may be made where the read/write amplifiers and switch are designed for digital signals. In this embodiment the digital signals are amplified on the head to provide a low impedance drive which reduces the impedance anomalies of the transfer of the signals off the head, thereby improving the performance of digital tapes.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. A rotating scan device for use with magnetic storage media, comprising in combination:
    a. a rotor;
    b. multiple magnetic transducers on said rotor with suitable gaps and orientations for writing or reading electronically modulated signals directly to or from magnetic storage media; said transducers scanning in a helical fashion and including video and audio heads;
c. means on said rotor for receiving and amplifying said signals read by said magnetic transducers;
d. means on said rotor for transferring said amplified read signals from said rotating device;
e. means on said rotor for receiving write signals;
f. means on said rotor for driving said magnetic transducers with said write signals;
g. means for transferring power to said amplifying, transferring, receiving and driving means;
h. analog switch means on said rotor for connecting one of the multiple video head signals to said transferring means for transferring amplified read signals, said analog switch means having a control input;
i. select means on said rotor, connected to said control input, for selecting which of the multiple video head signals is connected to said transferring means; and
j. means for transferring a logic select signal to said rotating device.

2. A rotating device as defined in claim 1 further comprising a stationary device for receiving said transferred amplified read signals from said rotating device; said stationary device transferring said write signals to said rotating device; and said storage media being a magnetic tape.

3. A rotating helical scan device as defined in claim 1 further comprising;
means on said rotor for receiving and amplifying an erase signal; and
means for applying said erase signal to said magnetic media and thereby erase the signals on said media.

4. A rotating helical scan device as defined in claim 1 wherein said transferring means are rotating transformers.

5. A rotating helical scan device as defined in claim 1 wherein said transferring means are slip rings.

6. A rotating helical scan device as defined in claim 1 wherein said transferring means are a combination of both rotating transformers and slip rings.

7. A rotating video head as defined in claim 1 further comprising:
means on said rotor for receiving and amplifying an erase signal;
means for applying said erase signal to said magnetic media and thereby erase the signals on said media;
logic select transfer means and erase transfer means being photoelectric devices; and
storage means where said logic select means signal is stored on said rotating video head.

8. A rotating helical scan device as defined in claim 1 wherein all of said means and said transducers are constructed and arranged to process digital signals.

9. A rotating video head as defined in claim 6 wherein said transfer means are Hall effect devices.

10. A rotating helical scan device for use with magnetic storage media, comprising, in combination:
(a) a rotor;
(b) a stationary device cooperating therewith;
(c) multiple magnetic transducers on said rotor having gaps and orientations for writing or reading electronic modulated signals directly to or from magnetic storage media, said transducers being video/audio heads;
(d) means on said rotor for receiving and amplifying the signals read from said magnetic transducers;
(e) means on said rotor for transferring said amplified read signals to the stationary device;
(f) means on said rotor for transferring write signals to the magnetic transducers;
(g) means on said rotor for driving said magnetic transducers with the write signals;
(h) means for transferring power from said stationary device to said rotor;
(i) analog switch means on said rotor for connecting one of the multiple video head signals to said transferring means for transferring amplified read signals;
(j) select means on said rotor for connecting said switch means to one of the multiple video head signals; and
(k) means for transferring logic select signals to said rotating head.

11. A rotating helical scan device as defined in claim 10 further comprising:
means on said rotor for generating an erase signal;
means for receiving and amplifying the erase signal; and
means for applying the erase signal to the magnetic storage media and thereby erase the signals on said media.

12. A rotating helical scan device as defined in claim 10, further comprising:
means for generating erase signals on said rotor;
means for receiving and amplifying the erase signal;
means for applying the erase signal to the magnetic storage media and thereby erase the signals on said media;
said select transfer means being photoelectric devices; and
storage means where said logic select means signal is stored on said rotating video head.

13. A rotating helical scan device as defined in claim 10 wherein all signals are digital signals.

14. A rotating helical scan device for use with magnetic storage media, comprising, in combination:
(a) a rotor;
(b) a stationary device cooperating therewith;
(c) multiple magnetic transducers on said rotor having gaps and orientations for reading electronic modulated signals directly from magnetic storage media, said transducers being video/audio heads;
(d) means on said rotor for receiving and amplifying the signals read from said magnetic transducers;
(e) means on said rotor for transferring said amplified read signals to the stationary device;
(f) means for transferring power from said stationary device to said rotor.
(g) analog switch means on said rotor for connecting one of the multiple video head signals to said transferring means;
(h) logic select means on said rotor for connecting said switch means to one of the multiple video head signals; and
(i) means for transferring said logic select signals to said rotating head.

15. A rotating helical scan device as defined in claim 14 wherein said transferring means are rotating transformers.

* * * * *